(12) United States Patent
Tsumura et al.

(10) Patent No.: US 7,700,224 B2
(45) Date of Patent: Apr. 20, 2010

(54) ELECTRONIC APPARATUS WITH SECURE BATTERY INSERTING AND REMOVING OPERATION

(75) Inventors: Tomohiro Tsumura, Aichi (JP); Kazuhiro Kitagawa, Aichi (JP); Kiyoshi Miyamori, Aichi (JP)

(73) Assignee: Sony Corporation, Tokyo (JP)

( * ) Notice: Subject to any disclaimer, the term of this patent is extended or adjusted under 35 U.S.C. 154(b) by 1160 days.

(21) Appl. No.: 11/262,795

(22) Filed: Nov. 1, 2005

(65) Prior Publication Data
US 2006/0134513 A1 Jun. 22, 2006

(30) Foreign Application Priority Data
Dec. 17, 2004 (JP) .............................. 2004-365645

(51) Int. Cl.
*H01M 2/10* (2006.01)
(52) U.S. Cl. ........................ 429/100; 429/96; 429/97; 429/98; 429/99; 429/180; 429/163
(58) Field of Classification Search ................ 439/160; 429/7, 94, 96–100, 180, 182, 183
See application file for complete search history.

(56) References Cited

U.S. PATENT DOCUMENTS 6,421,233 B1 * 7/2002 Hong .................... 361/679.55
6,445,948 B1 * 9/2002 Somdahl et al. ............... 607/2
6,796,819 B2 * 9/2004 Chen et al. ................... 439/160
2009/0098452 A1 * 4/2009 Takahashi et al. ........... 429/163

FOREIGN PATENT DOCUMENTS

| JP | 2003-45386 | 2/2003 |
|---|---|---|
| JP | 2004-120140 | 4/2004 |

* cited by examiner

*Primary Examiner*—Dah-Wei D Yuan
*Assistant Examiner*—Amanda Barrow
(74) *Attorney, Agent, or Firm*—Oblon, Spivak, McClelland, Maier & Neustadt, L.L.P.

(57) ABSTRACT

An electronic apparatus and a battery by which battery inserting and removing operations can be performed smoothly with certainty are disclosed. When a battery is inserted into a battery accommodating chamber, a locking projection of a spring is contacted once with and resiliently deformed outwardly in a widthwise direction by and then slidably moves on an edge portion of a projecting wall. However, when a connector section and an electronic apparatus side connector section are coupled soon, the locking portion of the spring is engaged with a locking recess. In this state, an inclined face of the locking portion displaced to the electronic apparatus side connector section is lockably engaged with a wall face of the locking recess displaced toward the connector section and biases the battery forwardly toward the electronic apparatus side connector section by resilient force of the resilient portion.

6 Claims, 18 Drawing Sheets

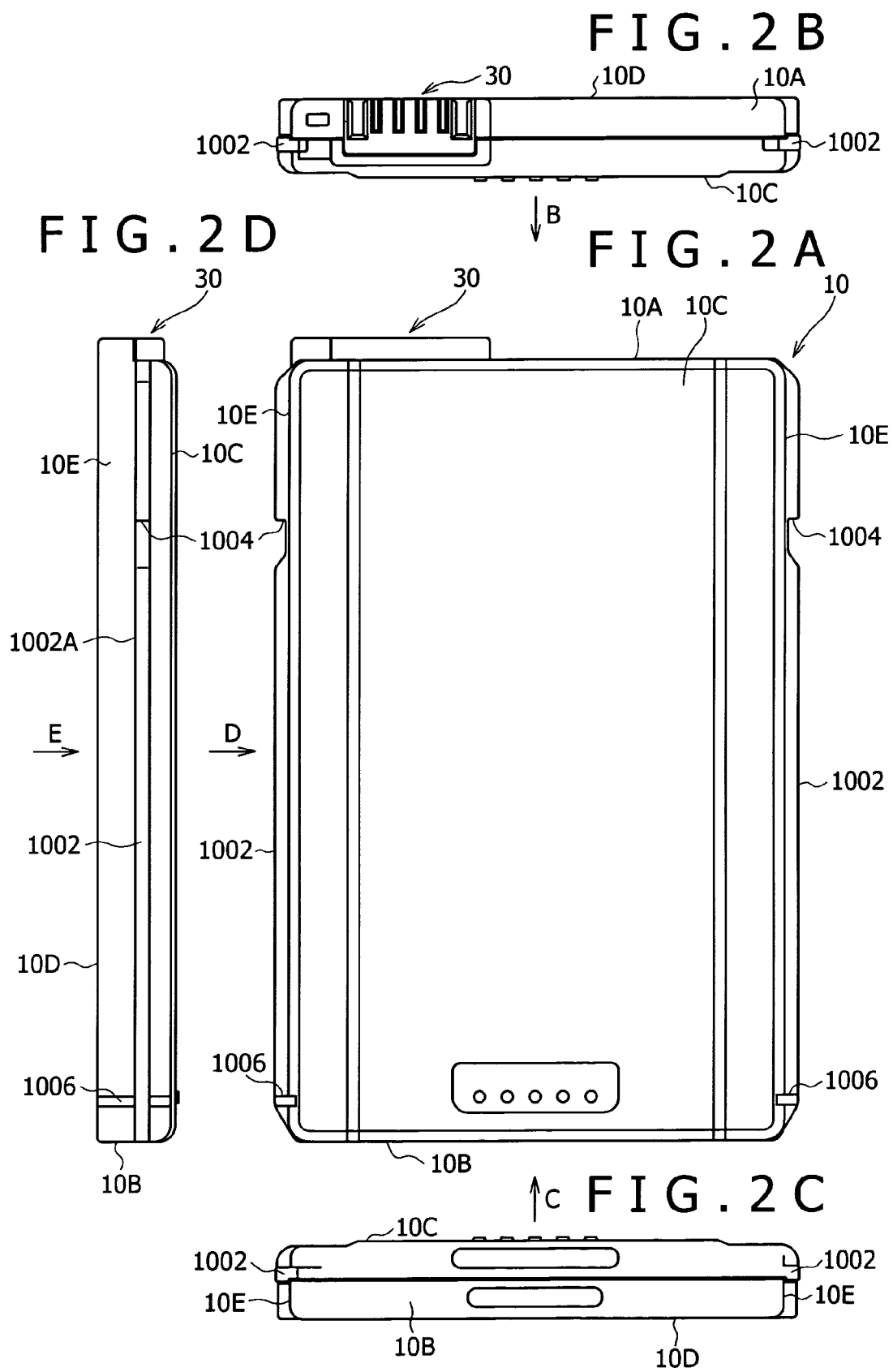

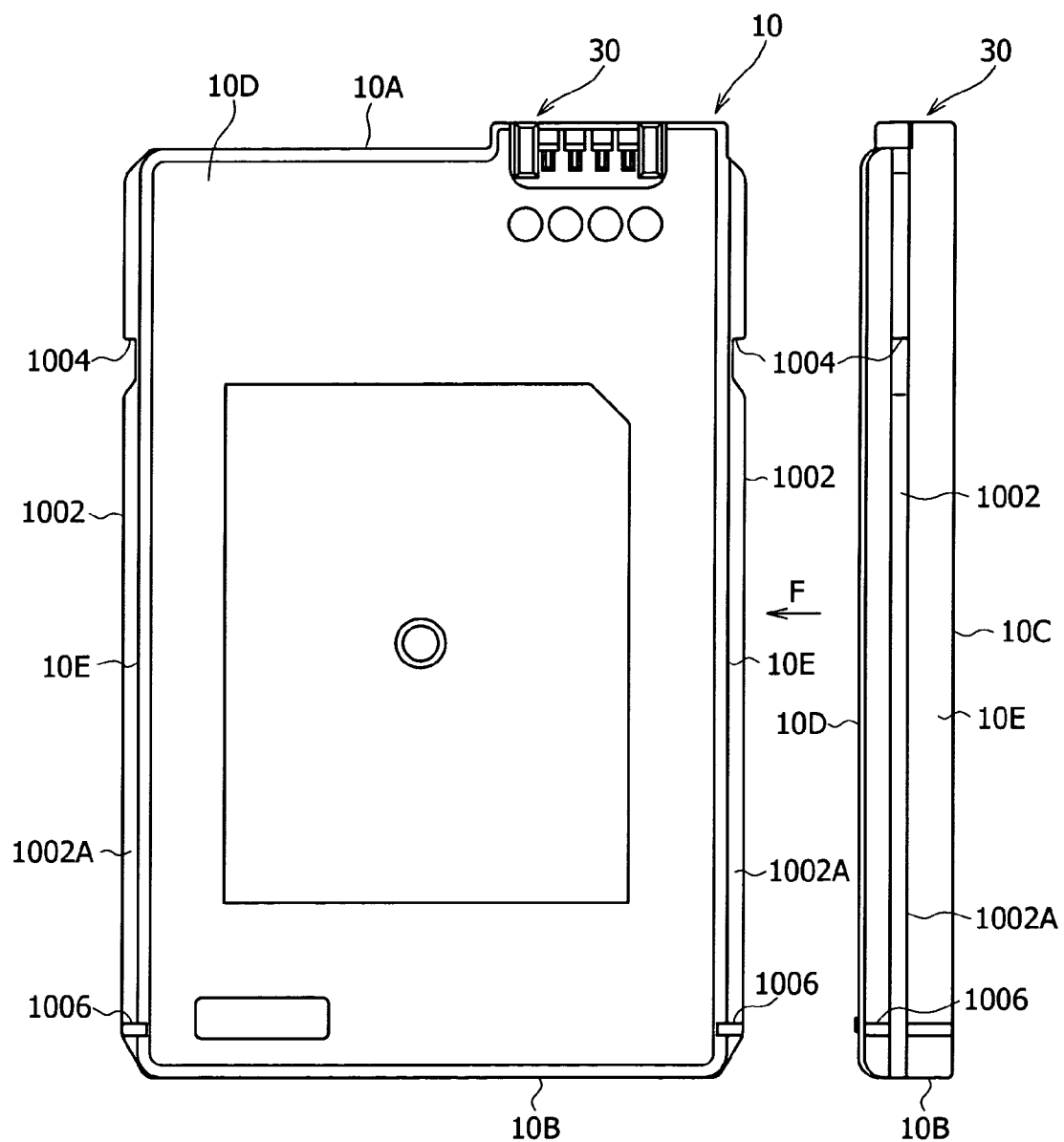

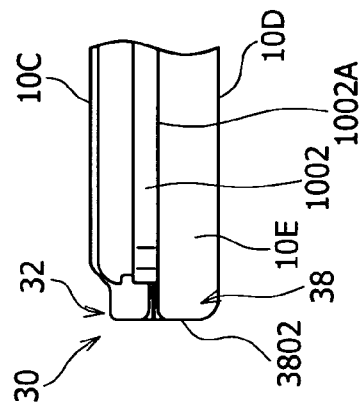
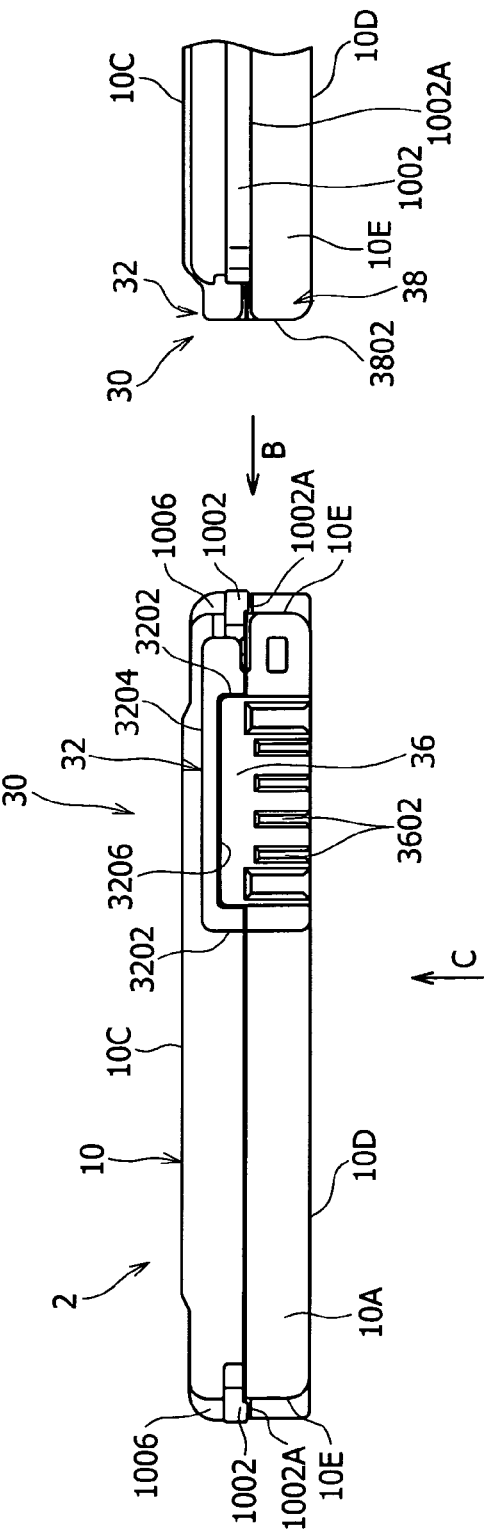
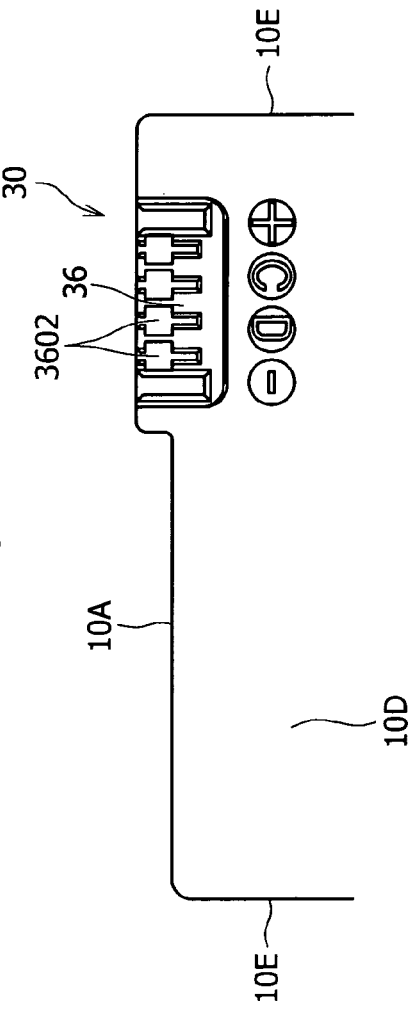

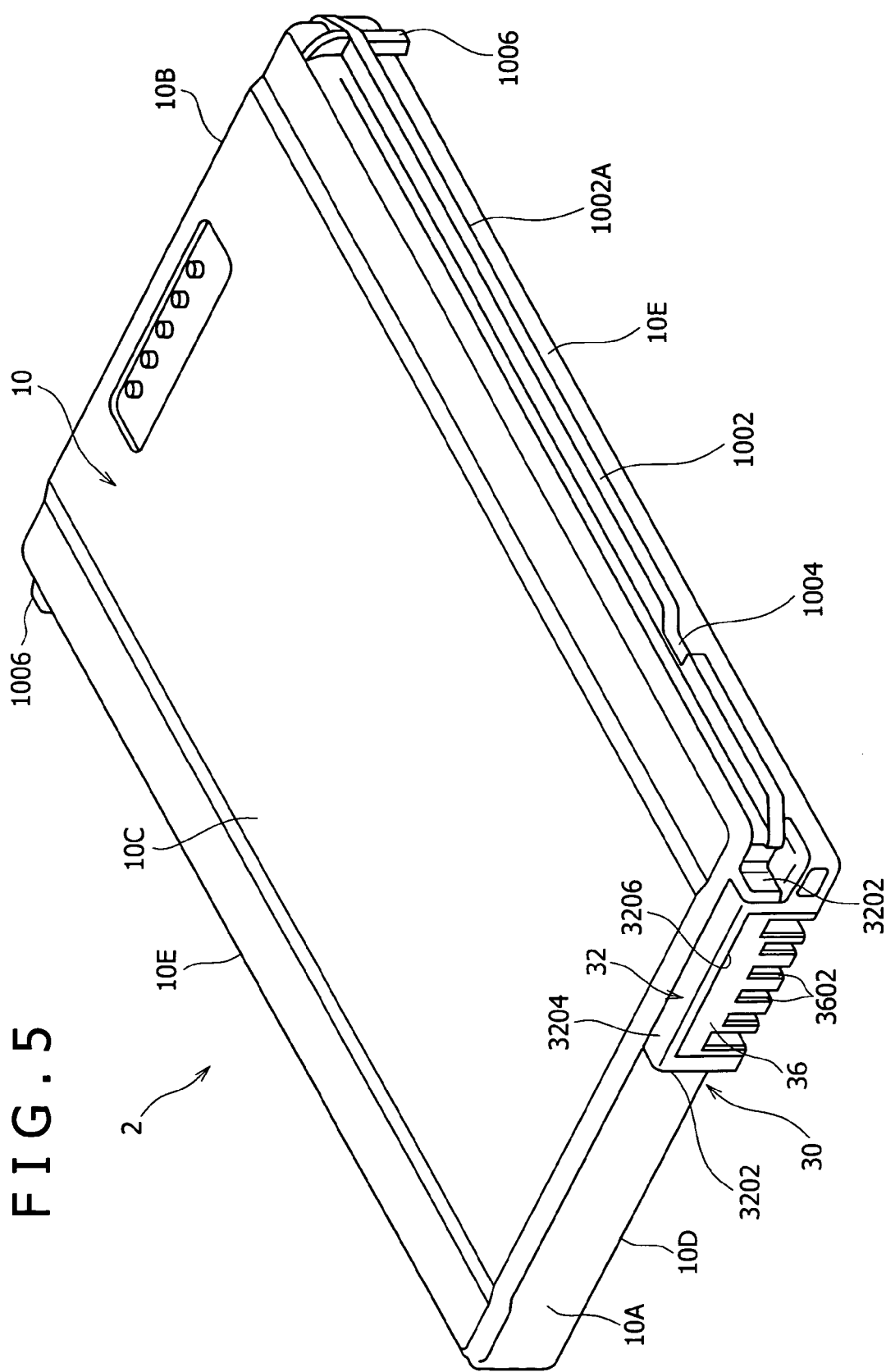

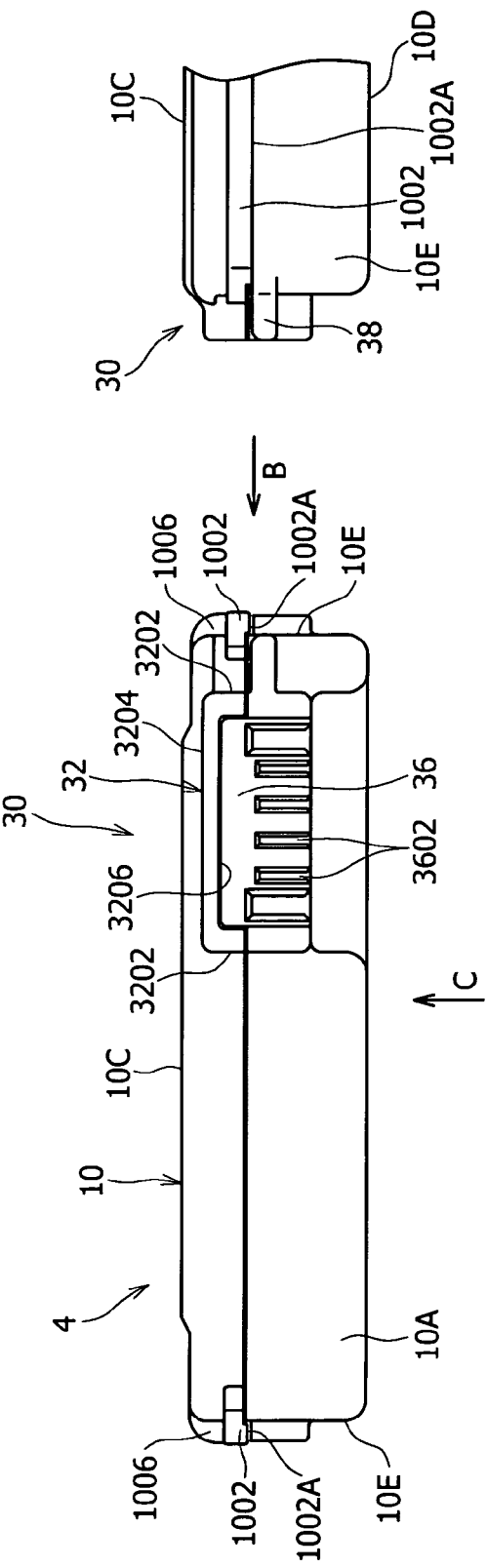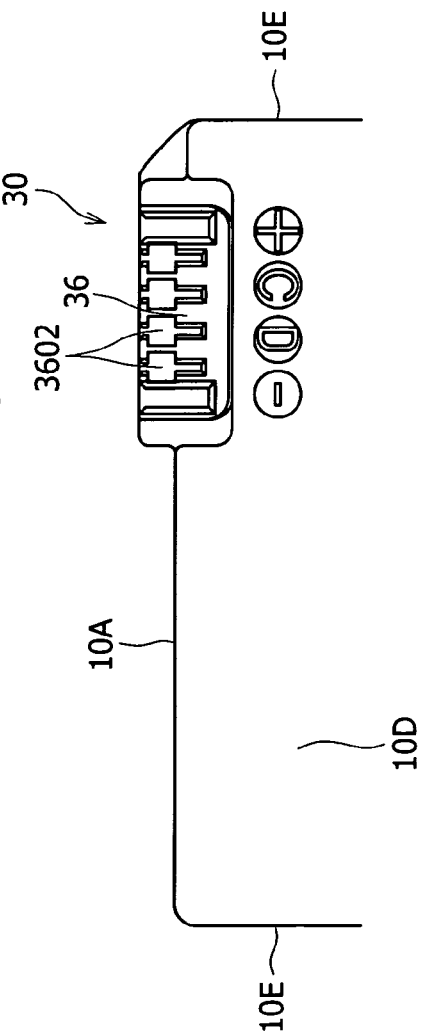

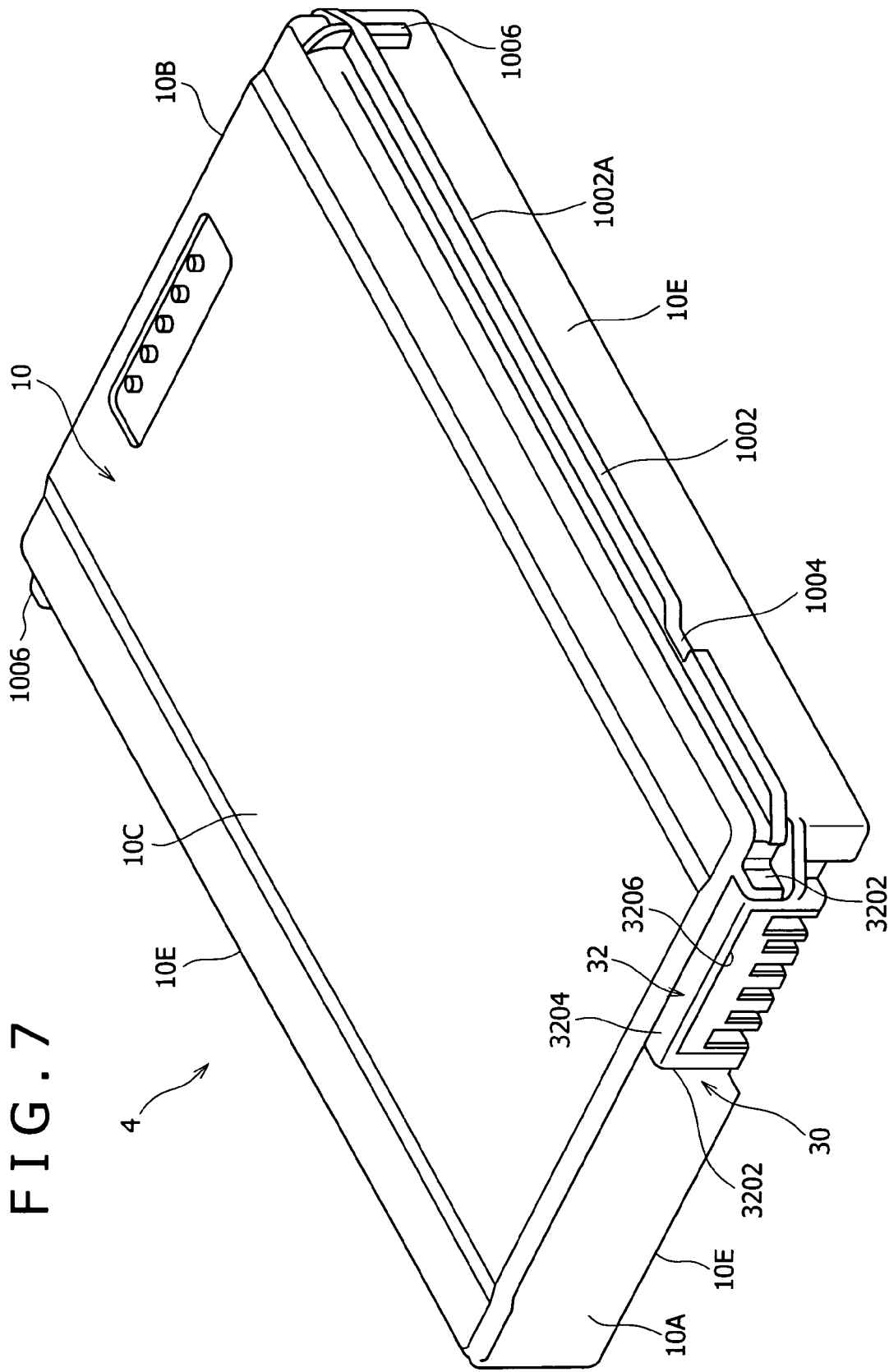

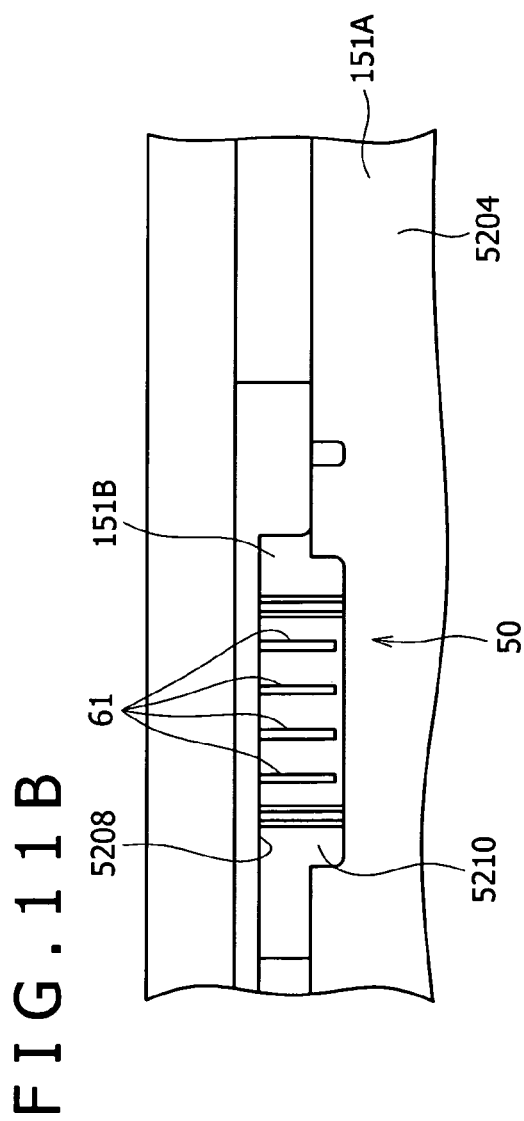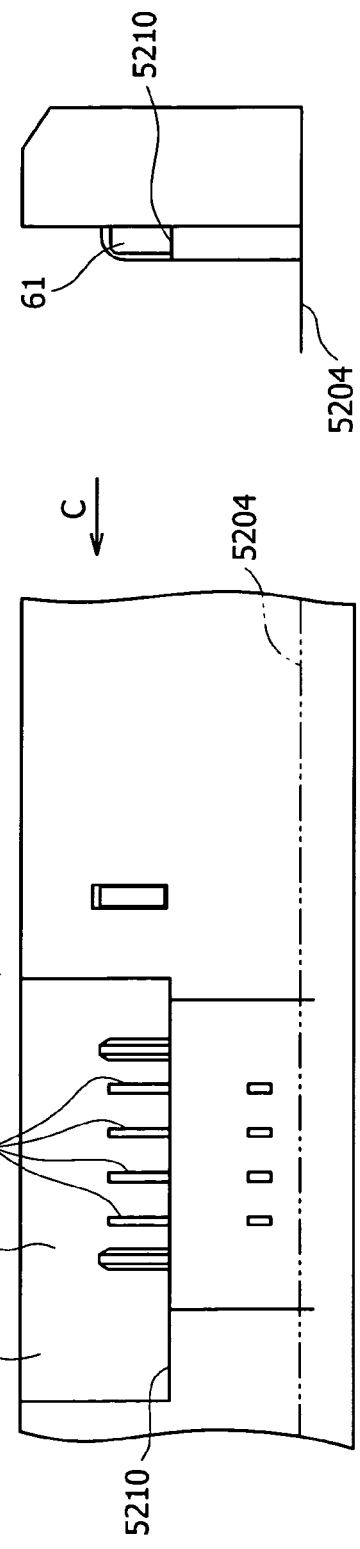

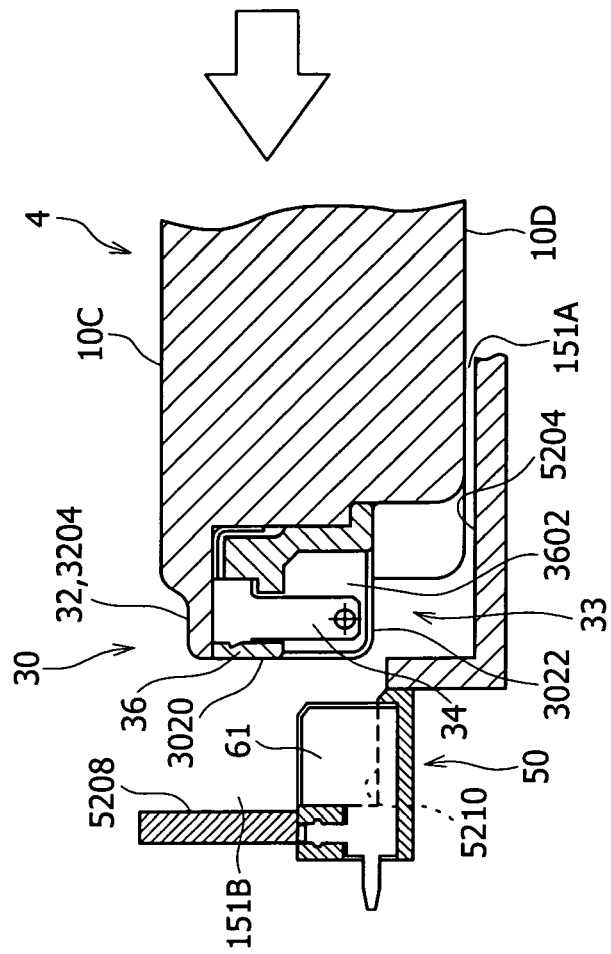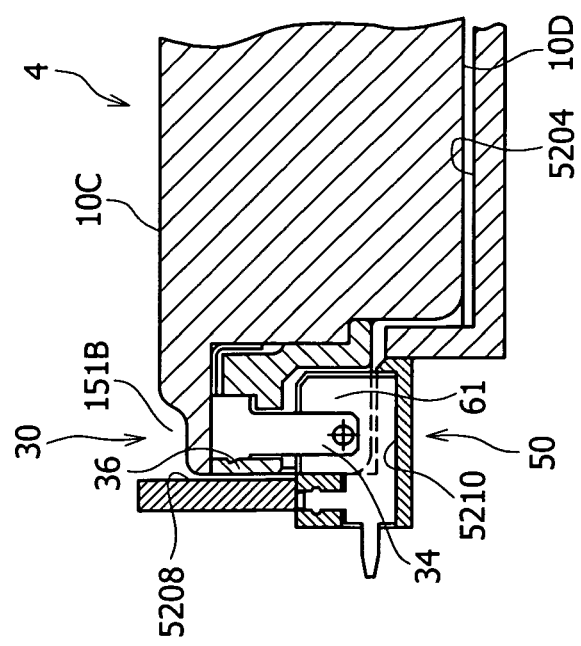

ELECTRONIC APPARATUS WITH SECURE BATTERY INSERTING AND REMOVING OPERATION

CROSS REFERENCES TO RELATED APPLICATIONS

The present invention contains subject matter related to Japanese Patent Application JP 2004-365645 filed in the Japanese Patent Office on Dec. 17, 2004, the entire contents of which being incorporated herein by reference.

BACKGROUND OF THE INVENTION

This invention relates to an electronic apparatus in which a battery is removably loaded and a battery for use with an electronic apparatus.

A battery is known which is incorporated in an electronic apparatus and includes a case having a length in the forward and backward direction, a battery cell accommodated in the case, and a connector section provided on the case. One of such batteries as just described is disclosed, for example, in Japanese Patent Laid-Open No. 2001-266826.

An electronic apparatus in which such a battery as just described is loaded is configured such that, when the battery is inserted along the lengthwise direction through an opening of a battery accommodating chamber provided in the electronic apparatus, the connector section of the battery side is connected to a connector section of the electronic apparatus side in the battery accommodating chamber.

SUMMARY OF THE INVENTION

Such an electronic apparatus as described above is in most cases configured such that, when a battery is accommodated in the battery accommodating chamber, the opening of the battery accommodating chamber is closed up with an opening/closing door and is locked in the closed up state to retain the battery in the battery accommodating chamber.

Accordingly, in a state wherein the opening/closing door is not closed while the battery is inserted in the battery accommodating chamber, the battery is not retained. Therefore, if the electronic apparatus is inclined or moved, then the battery is likely to run out from the battery accommodating chamber. Consequently, the battery and the electronic apparatus are disadvantageous in that inserting and removing operations of the battery into and from the electronic apparatus cannot be performed well.

It is desired to provide an electronic apparatus and a battery by which battery inserting and removing operations can be performed smoothly and with certainty.

According to the present invention, a spring for biasing a battery toward an electronic apparatus side connector section is provided in a battery accommodating chamber of an electronic apparatus.

More particularly, according to an embodiment of the present invention, there is provided an electronic apparatus, including a battery receiving section in which a battery is to be loaded, the battery receiving section including a battery accommodating chamber into which the battery is inserted and an electronic apparatus side connector section provided at an interior portion of the battery accommodating chamber in the insertion direction for being coupled to a connector section of the battery, and a spring provided in the battery accommodating chamber for biasing the battery toward the electronic apparatus side connector section.

More particularly, according to another embodiment of the present invention, there is provided a battery including a case of a flattened substantially rectangular plate shape having an upper face and a lower face positioned at the opposite ends in a thicknesswise direction, left and right side faces positioned at the opposite ends in a direction of a width having a greater dimension than the thickness and a front face and a rear face positioned at the opposite ends in a forward and backward direction of a length having a greater dimension than the width, a battery cell accommodated in the inside of the case, and a connector section provided on the front face of the case, each of the left and right side faces of the case having a locking recess for lockably engaging with a spring for biasing the case.

With the electronic apparatus, since the spring for biasing the battery toward the electronic apparatus side connector section is provided in the battery accommodating chamber, the battery is retained in a state wherein it is accommodated in the battery accommodating chamber by the spring.

Accordingly, even if the electronic apparatus is inclined or moved, letting off of the battery can be prevented. Further, since the battery is retained in a stable state in the battery accommodating chamber, inserting and removing operations of the battery can be performed smoothly and with certainty.

With the battery, where it is used with the electronic apparatus described above, the coupling state between the connector section of the battery and the electronic apparatus side connector section is maintained stably. Consequently, power can be supplied stably from the battery to the electronic apparatus.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 2A is a plan view of the first battery;

FIG. 2B is a view as viewed in the direction indicated by an arrow mark B of FIG. 2A;

FIG. 2C is a view as viewed in the direction indicated by an arrow mark C of FIG. 2A;

FIG. 2D is a view as viewed in the direction indicated by an arrow mark D of FIG. 2A;

FIG. 3E is a view as viewed in the direction indicated by an arrow mark E of FIG. 2D;

FIG. 3F is a view as viewed in the direction indicated by an arrow mark F of FIG. 3E;

FIG. 4A is a front elevational view of the first battery;

FIG. 4B is a view as viewed in the direction indicated by an arrow mark B of FIG. 4A;

FIG. 4C is a view as viewed in the direction indicated by an arrow mark C of FIG. 4A;

FIG. 5 is a perspective view of the first battery as viewed in a direction different from that of FIG. 1;

FIG. 6A is a front elevational view of a second battery according to the first embodiment of the present invention;

FIG. 6B is a view as viewed in the direction indicated by an arrow mark B of FIG. 6A;

FIG. 6C is a view as viewed in the direction indicated by an arrow mark C of FIG. 6A;

FIG. 7 is a perspective view of the second battery;

FIG. 11A is a front elevational view of an electronic apparatus side connector section of the image pickup apparatus;

FIG. 11B is a view as viewed in the direction indicated by an arrow mark B of FIG. 11A;

FIG. 11C is a view as viewed in the direction indicated by an arrow mark C of FIG. 11A;

FIGS. 16A and 16B are schematic views illustrating a relationship between a connector section of the second battery and the electronic apparatus side connector section of the image pickup apparatus;

DETAILED DESCRIPTION OF THE PREFERRED EMBODIMENTS

First Embodiment

Figure 1:
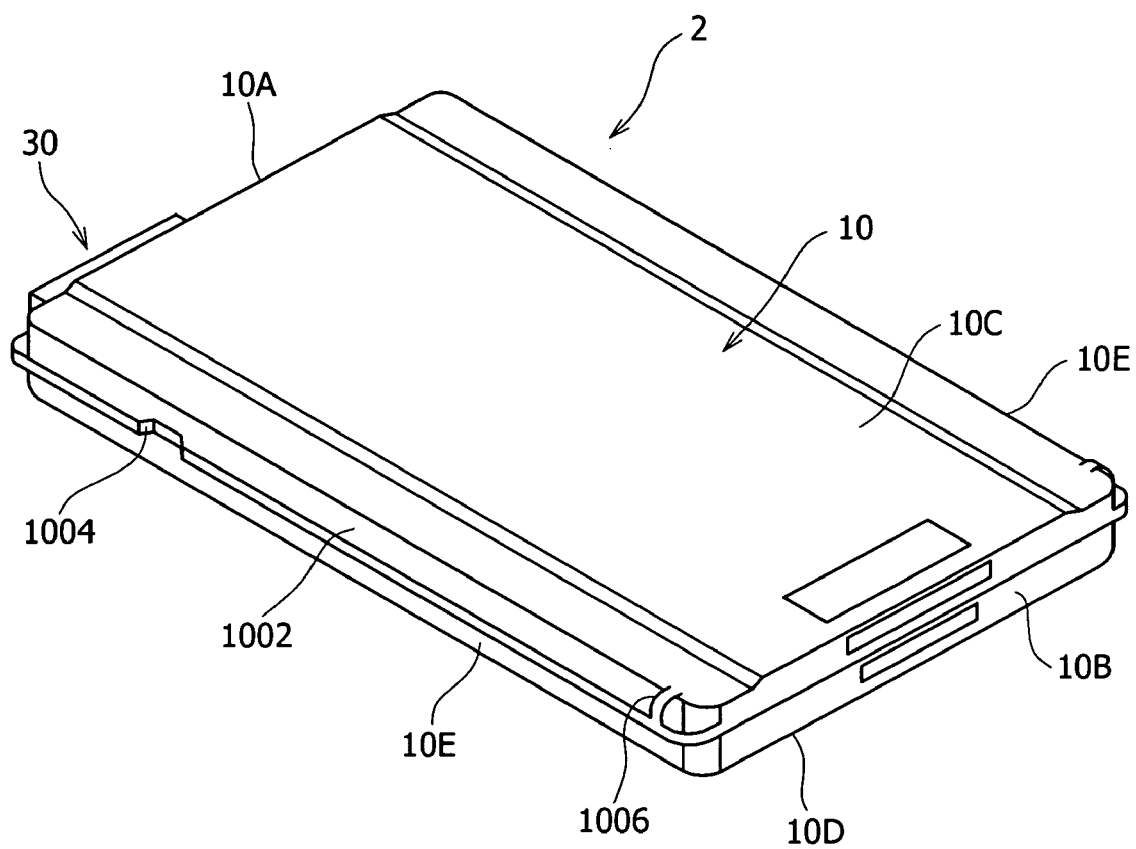
FIG. 1 is a perspective view of a first battery according to a first embodiment of the present invention.

A first embodiment of the present invention is described below with reference to the drawings.

First, a battery for use with an electronic apparatus according to the present invention is described with reference to FIGS. 1 to 8.

It is to be noted that, in some of the drawings, a plurality of straight lines or curved lines are drawn on a surface of a member or a portion of a member in order to indicate a cylindrical surface, a curved surface or an inclined surface.

Referring first to FIGS. 1 to 5, there is shown a first battery 2 according to the first embodiment of the present invention. The first battery 2 is a power supply of a comparatively small capacity and includes a case 10, a battery cell or a plurality of battery cells (not shown) accommodated in the case 10, and a connector section 30 provided on the case 10.

The case 10 is formed in a flattened rectangular plate-like shape having an upper face 10C and a lower face 10D positioned at the opposite ends in the direction a thickness, a pair of left and right side faces 10E positioned at the opposite ends in the direction of a width having a dimension greater than the thickness, and a front face 10A and a rear face 10B positioned at the opposite ends of a length having a dimension greater than the width. It is to be noted that the leftward and rightward direction of the case 10 is represented as viewed from forwardly of the case 10.

Each of the two side faces 10E has a locking recess 1004 for a spring 60 (FIG. 8) hereinafter described.

In the present embodiment, a projecting wall 1002 is provided on each of the two side faces 10E such that it projects outwardly in a widthwise direction and extends in the lengthwise direction.

The locking recesses 1004 are formed by cutting away the projecting walls 1002.

The locking recesses 1004 are provided at locations of the left and right side faces 10E displaced toward the front face 10A with respect to the center in the forward and backward direction.

The projecting walls 1002 are provided at locations of the side faces 10E displaced to the upper face 10C or the lower face 10D from the center in the thicknesswise direction, and particularly in the present embodiment, the projecting walls 1002 are provided at locations displaced to the upper face 10C. Accordingly, even if it is tried to insert the first battery 2 upside down, that is, in a vertically reversed state, the projecting walls 1002 are not inserted into engaging grooves 54 (hereinafter described), and consequently, wrong insertion of the first battery 2 upside down is prevented.

A stopper wall 1006 is formed in a swollen fashion at a location of each of the side faces 10E near to the rear face 10B. The stopper walls 1006 are individually connected to the projecting walls 1002 and prevent the rear face 10B side of the case 10 from being inserted into a battery accommodating chamber 151 of an image pickup apparatus 100 (hereinafter described). Thus, the stopper walls 1006 serve as opposite direction insertion preventing walls.

The connector section 30 is provided on the front face 10A of the case 10 such that it projects forwardly. In the present embodiment, the connector section 30 is provided at a location of the front face 10A rather near to a right end in the widthwise direction of the front face 10A and extends in the widthwise direction.

The position of the connector section 30 in the widthwise direction on the front face 10A is determined with reference to faces of the projecting walls 1002 of the left and right side faces 10E which oppose to the upper face 10C or the lower face 10D. In the present embodiment, faces 1002A of the projecting walls 1002 which oppose to the lower face 10D make a reference to the position of the connector section 30 in the thicknesswise direction.

Figure 14:
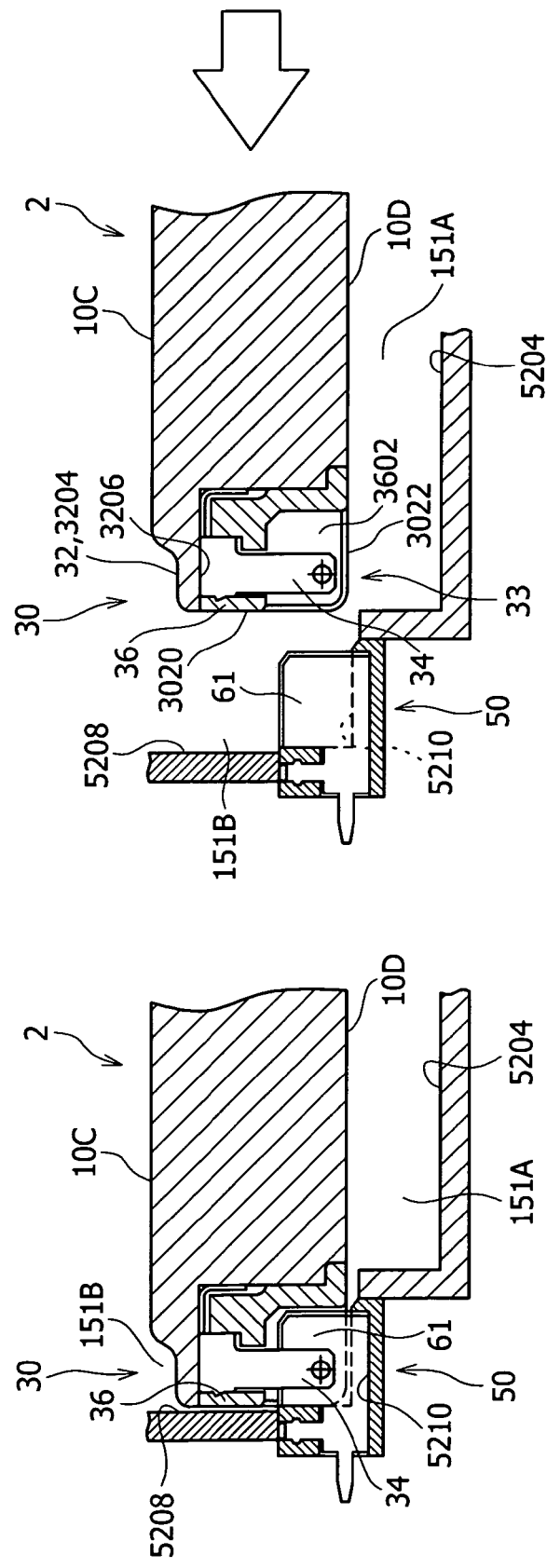
FIGS. 14A and 14B are schematic views illustrating a relationship between a connector section of the first battery and the electronic apparatus side connector section of the image pickup apparatus.

Referring to FIGS. 4A to 4C, the connector section 30 has a connector wall section 32 swollen in the lengthwise direction from the front face 10A, and a contact section 33 (FIG. 14) connected to the battery cell or cells.

The connector wall section 32 is provided to reinforce the connector section 30 and has a pair of vertical walls 3202 spaced from each other in the widthwise direction and extending in the thicknesswise direction, and a transverse wall 3204 extending in the widthwise direction at a location rather near to the upper face 10C and interconnecting end portions of the vertical walls 3202 in the thicknesswise direction.

The vertical walls 3202 and the transverse wall 3204 cooperatively define a space 3206 which is open in the widthwise direction (forwardly) and is open to the other face (downwardly) from between the faces at the opposite ends in the thicknesswise direction.

Referring to FIGS. 5, 14A and 14B, a terminal forming member 36 made of an insulating material such as a synthetic resin material is disposed in the open space 3206.

The terminal forming member 36 has a plurality of grooves 3602 formed in a spaced relationship from each other in the widthwise direction in such a manner as to be open in the lengthwise direction (forwardly) and extend in the thicknesswise direction. The grooves 3602 are formed such that they are open to the lower face 10D.

The contact section 33 is formed from a plurality of pairs of contact pieces 34 juxtaposed in a spaced relationship in the widthwise direction such that the contact pieces 34 in each pair are opposed to each other in the widthwise direction and are open forwardly and downwardly. In the present embodiment, the contact pieces 34 are provided in a spaced relationship from each other in the widthwise direction between the vertical walls 3202. Further, in the present embodiment, the contact pieces 34 form side faces of the grooves 3602 which are opposed to each other.

In the present embodiment, a lower face 3022 of the connector section 30 and the lower face 10D of the case 10 are positioned on the same plane.

Now, a second battery 4 according to the first embodiment of the present invention is described.

Referring to FIGS. 6A to 6C and 7, the second battery 4 is used as a power supply of a large capacity and is configured in a similar manner to the first battery 2 except the dimension in the thicknesswise direction and the position of the connector section 30 in the thicknesswise direction with reference to the upper face 10C or the lower face 10D.

As seen from FIGS. 6A to 6C and 7, the case 10 of the first battery 2 and the case 10 of the second battery 4 are formed equal in width and length to each other, but the case 10 of the second battery 4 has a greater thickness than the case 10 of the first battery 2.

The connector section 30 provided on the second battery 4 and the connector section 30 provided on the first battery 2 are formed in the same shape and structure.

Similarly as in the first battery 2, a locking recess 1004 for a spring 60 (FIG. 8) is formed on each of the opposite side faces 10E of the second battery 4.

A projecting wall 1002 is provided on each of the opposite side faces 10E such that it projects outwardly in a widthwise direction and extends in the lengthwise direction. The locking recesses 1004 are formed by cutting away the projecting walls 1002 and provided at locations of the left and right side faces 10E displaced toward the front face 10A with respect to the central portion in the forward and backward direction.

Further, the projecting walls 1002 in the second battery 4 are provided, similarly as in the first battery 2, at locations of the side faces 10E displaced to the upper face 10C or the lower face 10D with respect to the center in the thicknesswise direction. Particularly in the present embodiment, the projecting walls 1002 are provided at locations displaced to the upper face 10C. Accordingly, even if it is tried to insert the second battery 4 upside down, that is, in a vertically reversed state, the projecting walls 1002 are not inserted into the engaging grooves 54 (hereinafter described), and consequently, wrong insertion of the second battery 4 upside down is prevented.

The position of the connector section 30 of the second battery 4 in the thicknesswise direction is determined with the dimensions same as those in the first battery 2 with reference to faces of the projecting walls 1002 of the left and right side faces 10E which oppose to the upper face 10C or the lower face 10D. In the present embodiment, faces 1002A of the projecting walls 1002 which oppose to the lower face 10D make a reference to the position of the connector section 30 in the thicknesswise direction.

Accordingly, the connector sections 30 of the first and second batteries 2 and 4 have an equal height from the projecting walls 1002. However, while, in the first battery 2, the lower face 3022 of the connector section 30 is positioned on the same plane as the lower face 10D of the case 10, the lower face 3022 of the connector section 30 of the second battery 4 is positioned at a location higher than the lower face 10D of the case 10 as seen in FIGS. 14A, 14B, 16A and 16B.

Now, an electronic apparatus to which the present invention is applied is described.

In the present embodiment, the electronic apparatus is formed as an image pickup apparatus such as a digital video camera.

Figure 9:
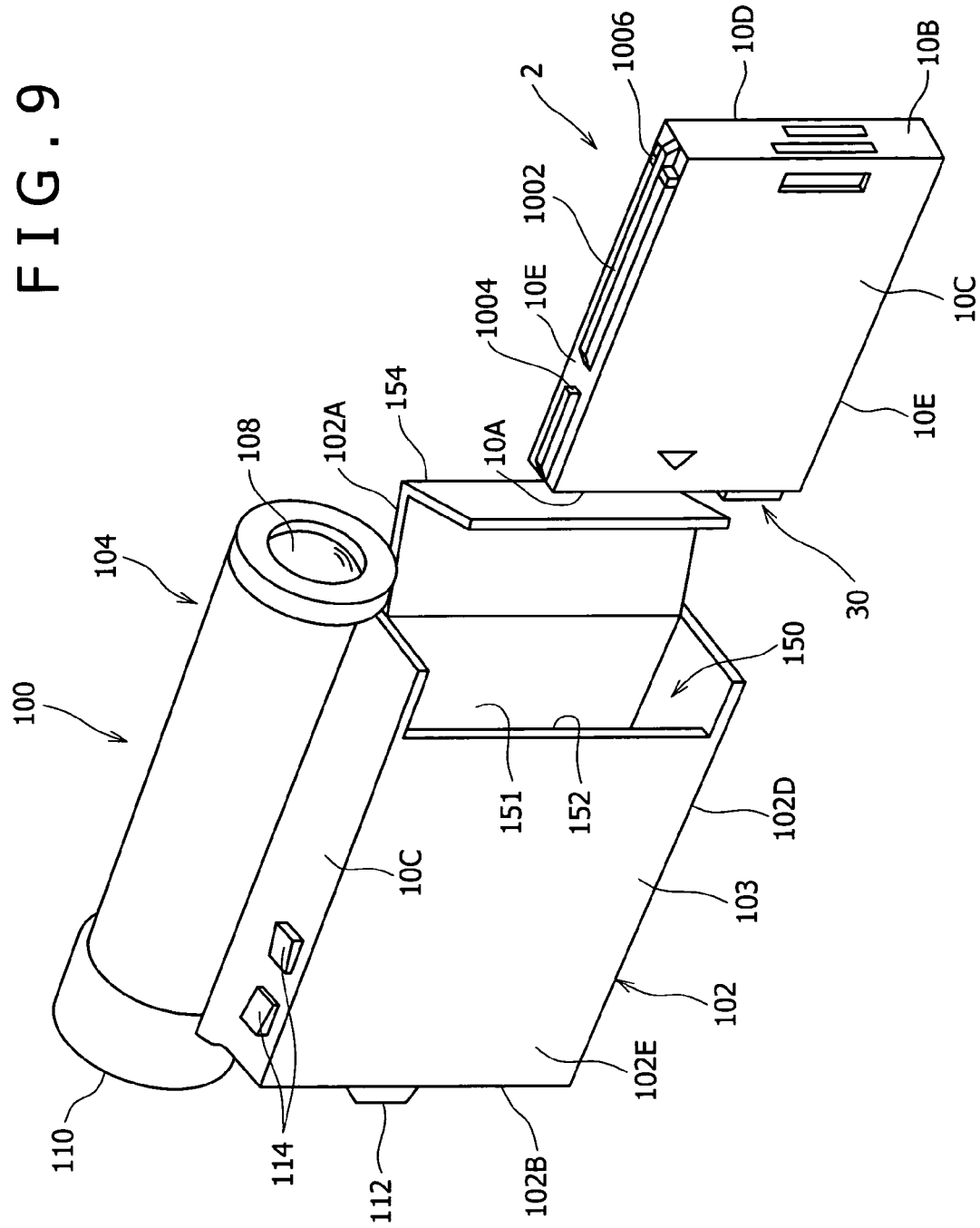
FIG. 9 is a perspective view of an image pickup apparatus to which the present invention is applied.

Referring to FIG. 9, the image pickup apparatus is generally denoted by 100 and has a body case 102 which forms a sheath. The body case 102 has a height in the vertical direction, a length in the forward and backward direction smaller than the height, and a width in the leftward and rightward direction smaller than the length. It is to be noted that the left and the right of the body case 102 in the present specification are represented as viewed from the front side (subject side).

A body tube 104 is incorporated at an upper portion of the body case 102, and an image pickup element 106 (FIG. 10) is incorporated at a rear portion of the body tube 104. Further, an optical system 108 for introducing an image of a subject to the image pickup element 106 is incorporated in the body tube 104.

The optical system 108 is formed from a plurality of optical members including a zoom lens, a focusing lens and an objective lens.

The body case 102 has a front wall 102A facing forwardly, a rear wall 102B facing rearwardly, an upper wall 102C facing upwardly, a lower wall 102D facing downwardly, a left side wall 102E facing leftwardly and a right side wall 102F facing rightwardly.

A viewfinder 110 for visually observing an image being picked up is provided at an upper portion of the rear wall 102B of the body case 102.

A start/stop switch 112 for starting/stopping image pickup of moving pictures is provided at a location of the rear wall 102B below the viewfinder 110.

Operation switches 115 (FIG. 10) including operation switches relating to image pickup such as zoom switches 114 for performing zooming operation of the optical system 108 are provided at locations rather near to a rear portion of the upper wall 102C of the body case 102.

A display panel 164 (FIG. 10) for displaying an image such as a still picture or a moving picture, characters, symbols and so forth is provided on the right wall of the body case 102. Also a medium accommodation section for accommodating a storage medium 160 (FIG. 10) such as a magnetic tape cassette, an optical disk or a memory card for recording image information and sound information is provided on the right wall of the body case 102.

A battery receiving section 150 for removably accommodating the first battery 2 is provided on the body case 102.

The battery receiving section 150 includes a battery accommodating chamber 151 and an electronic apparatus side connector section 50 (FIG. 11).

The battery accommodating chamber 151 has an opening 152 through which the first and second batteries 2 and 4 are inserted in the lengthwise direction (forward and backward direction) into the battery accommodating chamber 151. An opening/closing door 154 is provided for rocking motion at the opening 152. The front wall 102A is formed from a portion of the opening/closing door 154 which faces forwardly when the opening 152 is closed.

The opening/closing door 154 is locked, in a state wherein it closes the opening 152, by a locking member not shown to keep the closing state. When the locking by the locking member is canceled, then the opening/closing door 154 can open the opening 152.

Referring to FIGS. 14A, 14B, 16A and 16B, the electronic apparatus side connector section 50 is disposed in the interior portion of the battery accommodating chamber 151 in the direction in which the first and second batteries 2 and 4 are inserted and can be connected to the connector section 30 of the first and second batteries 2 and 4.

The battery accommodating chamber 151 has a case accommodating chamber 151A for accommodating the case 10 of the first and second batteries 2 and 4 therein and a connector section accommodating chamber 151B provided at the interior portion of the case accommodating chamber 151A for accommodating the connector section 30 of the first battery 2. The electronic apparatus side connector section 50 is provided in the connector section accommodating chamber 151B.

Figure 13:
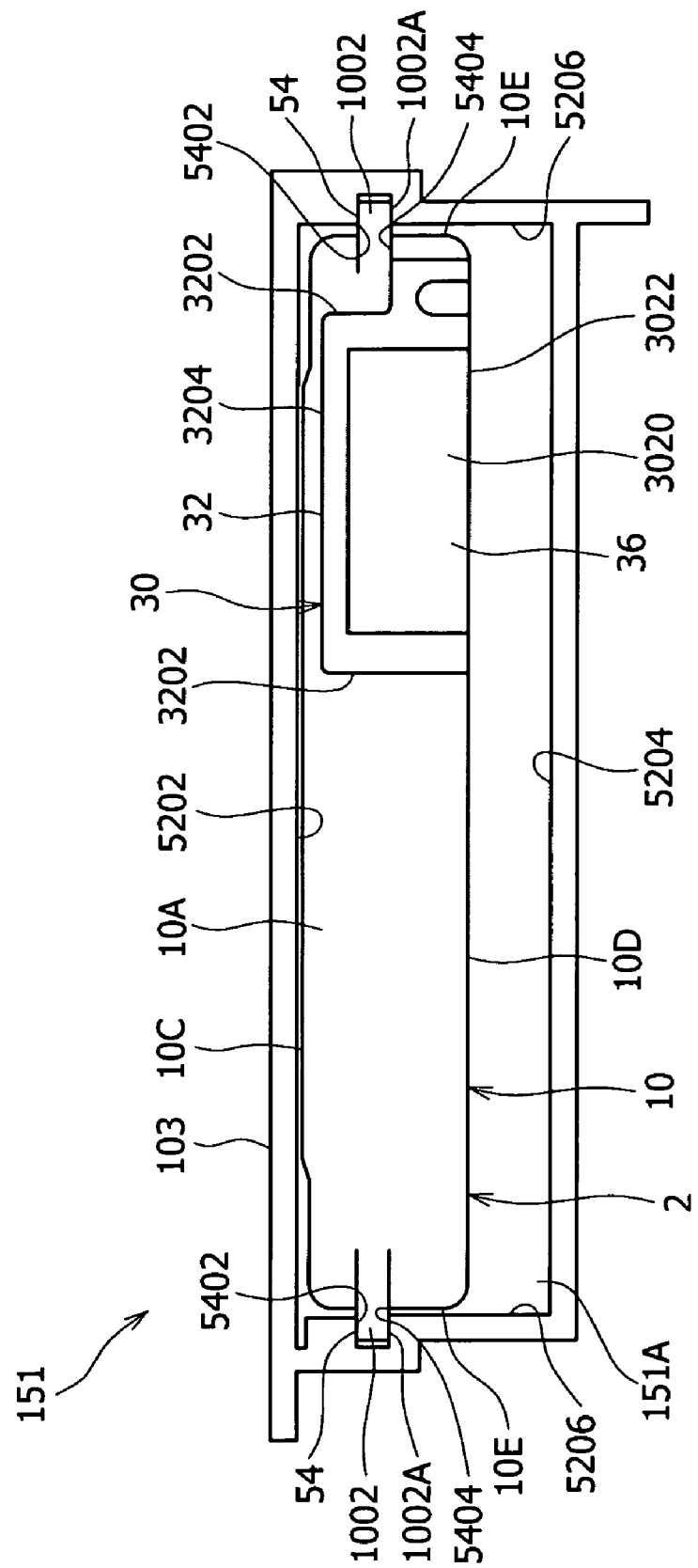
FIG. 13 is a schematic view showing the first battery incorporated in the battery receiving section.
Figure 15:
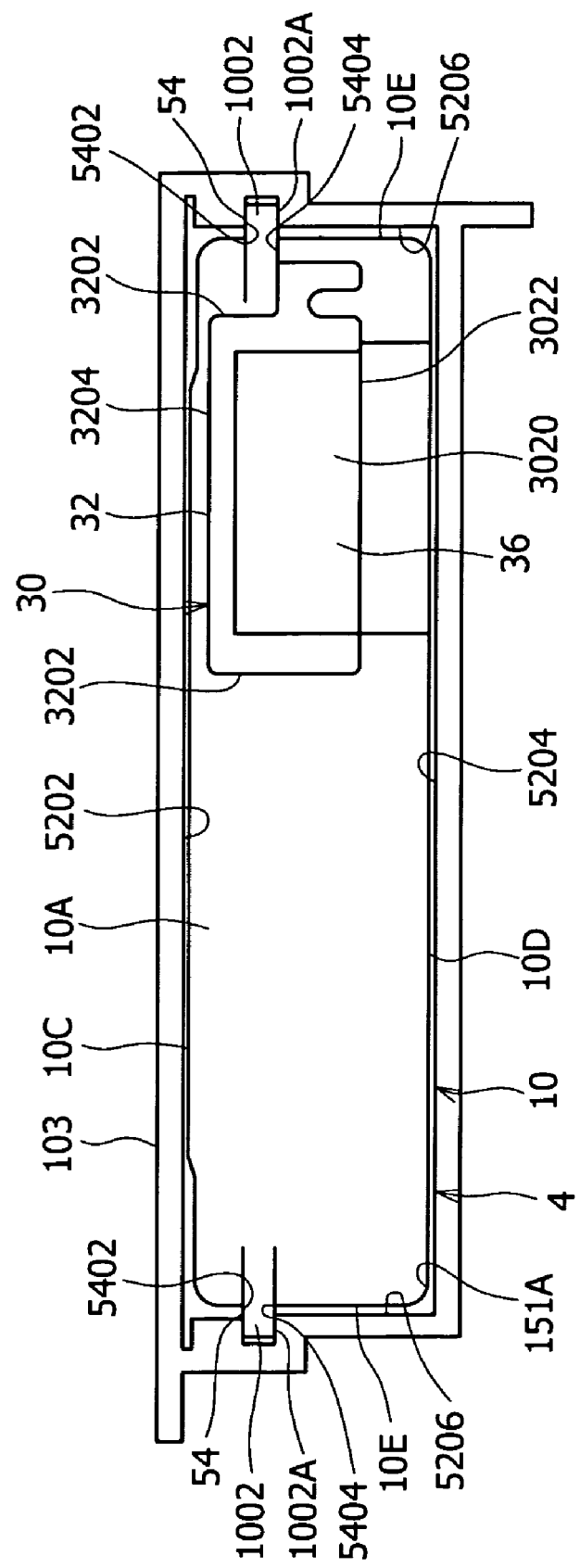
FIG. 15 is a schematic view showing the second battery loaded in the battery mounting section.

Referring to FIGS. 13 and 15, the case accommodating chamber 151A has an upper face 5202, a lower face 5204 and side faces 5206 for facing the upper face 10C, lower face 10D and left and right side faces 10E of the case 10 of the first and second batteries 2 and 4, respectively.

Referring to FIGS. 14A, 14B, 16A and 16D, the connector section accommodating chamber 151B has an interior face 5208 connected to the case accommodating chamber 151A and facing a forwardly facing front face 3020 of the connector section 30 of the first and second batteries 2 and 4, and a lower face 5210 facing the downwardly facing lower face 3022 of the connector section 30.

The lower face 5210 of the connector section accommodating chamber 151B is provided at a location of the case accommodating chamber 151A displaced to the upper face 5202 with respect to the lower face 5204 of the battery accommodating chamber 151.

Figure 12:
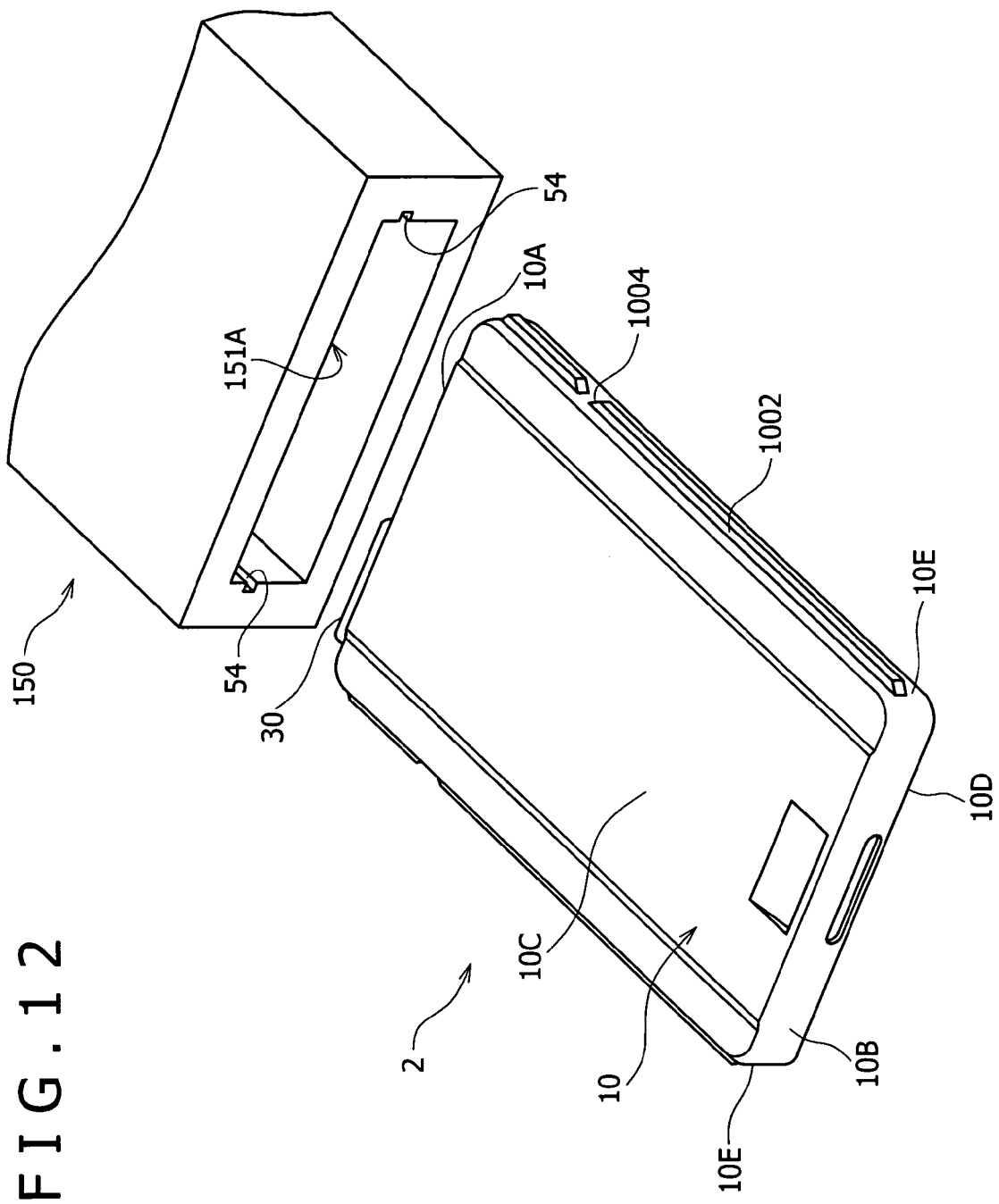
FIG. 12 is a perspective view showing the first battery and a battery receiving section of the image pickup apparatus.

Referring to FIGS. 12, 13 and 15, an engaging groove 54 is formed on each of the left and right side faces 5206 of the case accommodating chamber 151A in such a manner as to extend along the direction in which the first and second batteries 2 and 4 are inserted and be engageable with the projecting wall 1002 of each of the left and right side faces 10E of the first and second batteries 2 and 4.

The engaging groove 54 is provided at a location of each of the side faces 5206 displaced to the upper face 5202 or the lower face 5204 with respect to the central position in the upward and downward direction of the side face 5206. In the present embodiment, the engaging groove 54 is provided at a location of each side face 5206 displaced to the upper face 5202.

Each of the engaging grooves 54 has two wall faces 5402 and 5404 opposing to each other and extending in parallel to the upper face 5202 or lower face 5204, and the position of the electronic apparatus side connector section 50 in the upward and downward direction of the battery accommodating chamber 151 is determined with reference to one of the two wall faces 5402 and 5404 of the engaging groove 54 as seen in FIGS. 13 and 15. In the present embodiment, the wall face 5404 positioned on the lower side is used as a reference to the position in the thicknesswise direction of the electronic apparatus side connector section 50.

The upper face 10C of the case 10 and the upper face 5202 (wall face) of the case accommodating chamber 151A opposing to the upper face 10C are positioned in the proximity of each other in a state wherein the case 10 is accommodated in the case accommodating chamber 151A with the projecting walls 1002 of the first or second battery 2 or 4 engaged with the engaging grooves 54 of the case accommodating chamber 151A and with the connector section 30 coupled to the electronic apparatus side connector section 50. In the present embodiment, the upper face 5202 of the case accommodating chamber 151A is formed from an inner face (wall face) of a wall portion 103 which forms the body case 102 of the image pickup apparatus 100. It is to be noted that, if the image pickup apparatus 100 and the case 10 of the first and second batteries 2 and 4 are configured otherwise such that the upper face 10C of the case 10 and the upper face 5202 (wall face) of the case accommodating chamber 151A opposing to the upper face 10C are positioned in the proximity of each other in a state wherein the case 10 is accommodated in the case accommodating chamber 151A, then it is possible to cause the case 10 of the first and second batteries 2 and 4 as a reinforcing plate for the wall portion 103 which forms the body case 102 of the image pickup apparatus 100. Consequently, the body case 102 of the image pickup apparatus 100 can be formed with a comparatively small thickness, which is advantageous for miniaturization.

Further, in the present embodiment, the first or second battery 2 or 4 is inserted into the battery accommodating chamber 151 with the projecting walls 1002 thereof engaged with the engaging grooves 54 of the case accommodating chamber 151A, and the lower face of the connector section accommodating chamber 151B is provided at a location displaced to the upper face 5202 of the case accommodating chamber 151A with respect to the lower face 5204 of the case accommodating chamber 151A. Accordingly, the portion of each of the contact pieces 61 of the electronic apparatus side connector section 50 which is supported on the lower face 5210 of the connector section accommodating chamber 151B can be positioned at a location higher than the lower face 5204 of the case accommodating chamber 151A. Consequently, the electronic apparatus side connector section 50 does not project downwardly farther than the lower face 5204 of the case accommodating chamber 151A, and the case accommodating chamber 151A may be formed with a size with which the second battery 4 having a greater thickness can be accommodated. This is advantageous when it is intended to suppress the dimension of the battery accommodating chamber 151 in the upward and downward direction.

Referring to FIGS. 11A to 11C, 14A, 14B, 16A and 16B, the electronic apparatus side connector section 50 includes a plurality of contact pieces 61 supported in the interior face 5208 and the lower face 5210 of the connector section accommodating chamber 151B and juxtaposed in a spaced relationship from each other in a direction in which the left and right side faces 5206 of the case accommodating chamber 151A are connected to each other. The contact pieces 61 can individually contact with the contact pieces 34 of the connector section 30 of the first and second batteries 2 and 4.

Figure 8:
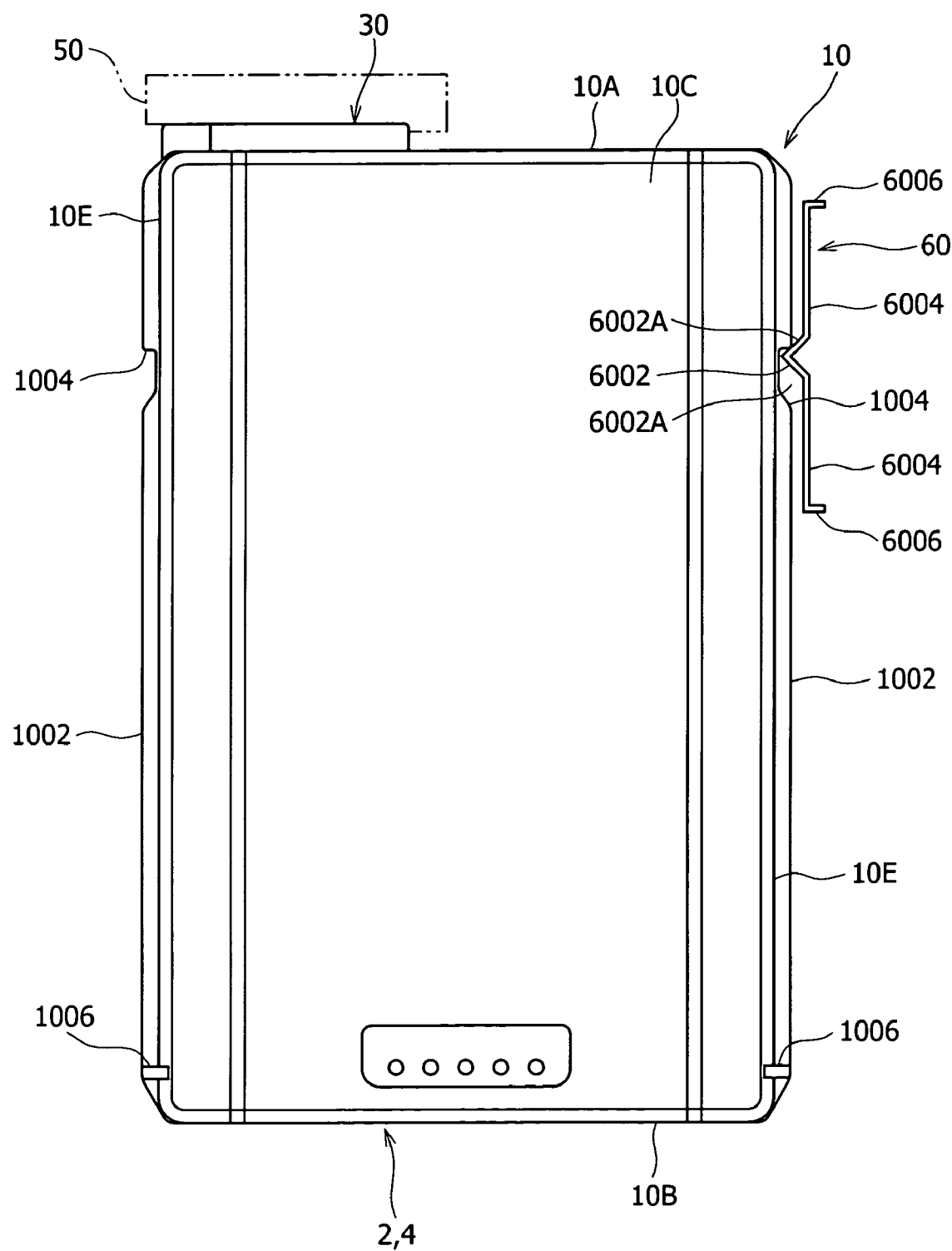
FIG. 8 is a schematic view of a battery and a spring.

Referring to FIG. 8, a spring 60 is provided in the battery accommodating chamber 151 and engages with a portion of the first and second batteries 2 and 4 in a state wherein the connector section 30 of the first and second batteries 2 and 4 is coupled to the electronic apparatus side connector section 50. In the present embodiment, the spring 60 engages with the locking recess 1004 and biases the first or second battery 2 or 4 in a direction toward the electronic apparatus side connector section 50 (in the forward direction).

More particularly, the spring 60 is formed as an elongated band plate made of a spring steel material or the like. The spring 60 includes base portions 6006 positioned at the opposite ends of the band plate in the lengthwise direction for being attached to the wall face of the engaging groove 54, a resilient portion 6004 connecting the base portions 6006 on the opposite side thereof to each other, and a locking portion 6002 projecting laterally toward the battery side from a substantially central location of the resilient portion 6004 in the lengthwise direction for lockably engaging with the battery side.

The locking portion 6002 is formed from two inclined portions 6002A, and that one of the inclined portions 6002A which is positioned nearer to the electronic apparatus side connector section 50 is lockably engaged with the wall face of the locking recess 1004 nearer to the connector section 30 to bias the first or second battery 2 or 4 in a direction toward the electronic apparatus side connector section 50 (in the forward direction).

In the present embodiment, the locking portion 6002 is disposed at a location of one (right side one) of the engaging grooves 54 of the left and right side faces 5206 of the case accommodating chamber 151A displaced to the interior of the battery accommodating chamber 151 with respect to the center of the length along the insertion direction.

The electronic apparatus side connector section 50 is connected to a power supply circuit 172 (FIG. 10) of the image pickup apparatus 100.

Figure 10:
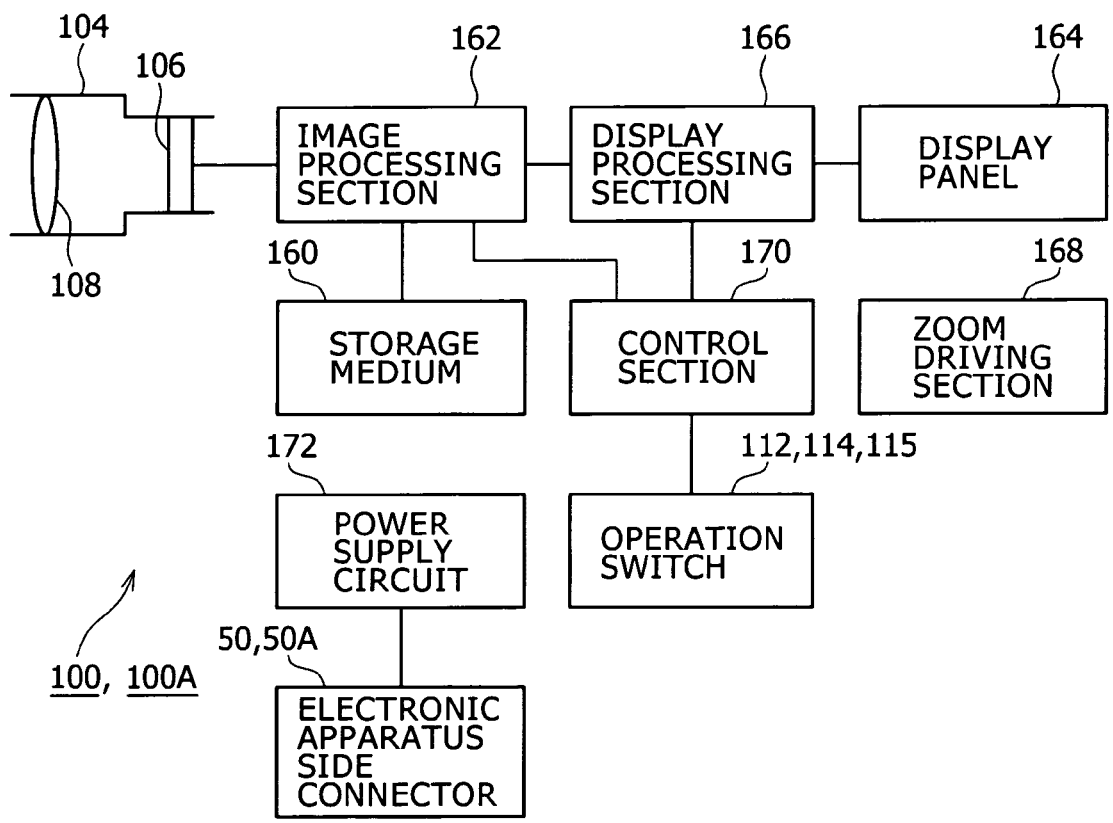
FIG. 10 is a block diagram showing a control system of the image pickup apparatus.

Referring to FIG. 10, the image pickup apparatus 100 includes an image processing section 162 for performing a predetermined data process for an image pickup signal outputted from the image pickup element 106 to produce image data and recoding the image data on a storage medium 160. The image pickup apparatus 100 further includes a display processing section 166 for displaying the image data on the display panel 164, a zoom driving section 168 for varying the image pickup magnification of the optical system 108, and a control section 170 for controlling the image processing section 162, display processing section 166, zoom driving section 168 and so forth in response to operations of the operation switches 112, 114 and 115. The image pickup apparatus 100 further includes the power supply circuit 172 for supplying dc power supplied from the first battery 2 through the electronic apparatus side connector section 50, 50A to the image processing section 162, display processing section 166 and zoom driving section 168.

Now, action of the image pickup apparatus 100 is described.

When the first battery 2 is to be loaded into the image pickup apparatus 100, the opening/closing door 154 would be opened as shown in FIG. 12, and while the upper face 10C, lower face 10D and left and right side faces 10E of the case 10 of the first battery 2 are opposed to the upper face 5202, lower face 5204 and left and right side faces 5206 of the case accommodating chamber 151A of the image pickup apparatus 100, respectively, the projecting walls 1002 of the first battery 2 would be inserted and pushed into the engaging grooves 54 of the battery accommodating chamber 151.

Consequently, the contact pieces 34 of the connector section 30 and the contact pieces 61 of the electronic apparatus side connector section 50 are contacted with each other thereby to couple the connector section 30 to the electronic apparatus side connector section 50 and the front face 3020 of the connector section 30 is positioned in the proximity of the interior face 5208 of the connector section accommodating chamber 151B while the lower face 3022 of the connector section 30 is opposed to the lower face 5210 of the connector section accommodating chamber 151B as seen in FIGS. 14A and 14B.

In this state, the upper face 10C of the first battery 2 is positioned in the proximity of the upper face 5202 (wall face) of the case accommodating chamber 151A, and the lower face 10D of the first battery 2 is positioned in a spaced relationship from the lower face 5204 of the case accommodating chamber 151A.

When the first battery 2 is inserted into the battery accommodating chamber 151, the locking portion 6002 of the spring 60 is brought into contact once with and resiliently deformed outwardly in the widthwise direction by an edge portion of the projecting wall 1002 and then slidably moves on the edge portion of the projecting wall 1002. However, when the connector section 30 and the electronic apparatus side connector section 50 are coupled to each other soon, the locking portion 6002 is engaged with the locking recess 1004. At this time, a click feeling is provided to the hand of the user.

In this state, that one of the inclined faces 6002A which is rather near to the electronic apparatus side connector section 50 is lockably engaged with the wall face of the locking recess 1004 rather near to the connector section 30 and the first battery 2 is biased toward the electronic apparatus side connector section 50 (forwardly) by the biasing force of the resilient portion 6004.

Thereafter, the opening/closing door 154 would be closed.

Consequently, dc power is supplied from the first battery 2 to the components of the image pickup apparatus 100 through the power supply circuit 172.

When the first battery 2 is to be removed, the opening/closing door 154 would be opened and the first battery 2 would be removed from the battery accommodating chamber 151 with a rear portion thereof grasped by the user.

At this time, the locking portion 6002 of the spring 60 is disengaged from the locking recess 1004 by the inclined face 6002A and slidably moves on the edge portion of the projecting wall 1002 while it rides on the edge portion of the projecting wall 1002 until it is disengaged from the edge portion of the projecting wall 1002 to restore the initial state of the spring 60.

Now, loading of the second battery 4 is described.

Similarly as in the case wherein the first battery 2 is loaded, the opening/closing door 154 would be opened, and while the upper face 10C, lower face 10D and left and right side faces 10E of the case 10 are opposed to the upper face 5202, lower face 5204 and left and right side faces 5206 of the case accommodating chamber 151A of the image pickup apparatus 100, respectively, the projecting walls 1002 of the second battery 4 would be inserted and pushed into the engaging grooves 54 of the battery accommodating chamber 151.

Consequently, the contact pieces 34 of the connector section 30 and the contact pieces 61 of the electronic apparatus side connector section 50 are contacted with each other to connect the connector section 30 to the electronic apparatus side connector section 50 and the front face 3020 of the connector section 30 is positioned in the proximity of the interior face 5208 of the connector section accommodating chamber 151B while the lower face 3022 of the connector section 30 is opposed to the lower face 5210 of the connector section accommodating chamber 151B as seen in FIGS. 16A and 16B.

In this state, the upper face 10C of the second battery 4 is positioned in the proximity of the upper face 5202 (wall face) of the case accommodating chamber 151A, and the lower face 10D of the second battery 4 is positioned in the proximity of the lower face 5204 of the case accommodating chamber 151A.

When the second battery 4 is inserted into the battery accommodating chamber 151, the locking portion 6002 of the spring 60 is brought into contact once with and resiliently deformed outwardly in the widthwise direction by an edge portion of the projecting wall 1002 and then slidably moves on the edge portion of the projecting wall 1002 similarly as in the case of the first battery 2. However, when the connector section 30 and the electronic apparatus side connector section 50 are coupled to each other soon, the locking portion 6002 is engaged with the locking recess 1004. At this time, a click feeling is provided to the hand of the user.

In this state, that one of the inclined faces 6002A which is rather near to the electronic apparatus side connector section 50 is lockably engaged with the wall face of the locking recess 1004 rather near to the connector section 30 and the second battery 4 is biased toward the electronic apparatus side connector section 50 (forwardly) by the biasing force of the resilient portion 6004.

Thereafter, the opening/closing door 154 would be closed.

Consequently, dc power is supplied from the second battery 4 to the components of the image pickup apparatus 100 through the power supply circuit 172.

When the second battery 4 is to be removed, the opening/closing door 154 would be opened and the second battery 4 would be removed from the battery accommodating chamber 151 with a rear portion thereof grasped by the user.

At this time, the locking portion 6002 of the spring 60 is disengaged from the locking recess 1004 by the inclined face 6002A and slidably moves on the edge portion of the projecting wall 1002 while it rides on the edge portion of the projecting wall 1002 until it is disengaged from the edge portion of the projecting wall 1002 to restore the initial state of the spring 60.

With the image pickup apparatus 100 of the present embodiment, the spring 60 for lockably engaging with the locking recess 1004 of a battery in a state wherein the connector section 30 of the battery is coupled to the electronic apparatus side connector section 50 to bias the battery toward the electronic apparatus side connector section 50 is provided on the battery accommodating chamber 151. Therefore, even if the opening/closing door 154 is opened while the battery is accommodated in the battery accommodating chamber 151, the battery is kept in the state wherein it is accommodated in the battery accommodating chamber 151 by the spring 60.

Accordingly, even if the image pickup apparatus 100 is inclined or moved while the opening/closing door 154 is open, inadvertent letting off of the battery can be prevented. Further, since the battery is held in the battery accommodating chamber 151 in a stable state, even if the opening/closing door 154 is opened, inserting and removing operations of a battery can be performed smoothly and with certainty.

Further, since the battery is biased toward the electronic apparatus side connector section 50 by the spring 60, it is advantageous that the coupling state of the connector section 30 and the electronic apparatus side connector section 50 is kept stably, which assures stable power supply through the electronic apparatus side connector section 50 from the connector section 30 of the battery.

Further, since the battery is biased toward the electronic apparatus side connector section 50 by the spring 60, the connector section 30 and the electronic apparatus side connector section 50 are biased in a direction in which the contact pieces 34 of the connector section 30 and the contact pieces 61 of the electronic apparatus side connector section 50 approach each other in a state wherein they are coupled to each other.

Accordingly, the overlapping amount of the contact pieces of the connector section 30 and the electronic apparatus side connector section 50 can be minimized when compared with an alternative case wherein the connector section 30 and the electronic apparatus side connector section 50 are merely connected to each other while the contact between the contact pieces is maintained well. Consequently, the dimension of the connector section 30 and the electronic apparatus side connector section 50 in the insertion direction of a battery can be reduced, which is advantageous for miniaturization of the image pickup apparatus 100.

Further, since the locking portion 6002 is provided at a location displaced to the interior of the battery accommodating chamber 151 with respect to the center of the length along the insertion direction of the battery accommodating chamber 151, even if the battery is inserted, for example, only at a portion thereof into the battery accommodating chamber 151 without the entirety thereof in the forward and backward direction thereof inserted, the locking portion 6002 can be lockably engaged with the locking recess 1004. Consequently, various connecting states of a battery can be coped with advantageously without the necessity to vary the design.

Further, the engaging grooves 54 for being engaged by the projecting walls 1002 are formed in the battery accommodating chamber 151, and the position of the electronic apparatus side connector section 50 in the thicknesswise direction of the battery in the battery accommodating chamber 151 is determined with reference to one of the wall faces 5402 and 5404 of the engaging groove 54.

Accordingly, when the first and second batteries 2 and 4 having different thicknesses from each other and each having the connector section 30 with reference to the projecting wall 1002 are engaged with the engaging grooves 54 of the battery accommodating chamber 151, the positions of the connector sections 30 of the first and second batteries 2 and 4 individually coincide with the position of the electronic apparatus side connector section 50. Consequently, both of the first and second batteries 2 and 4 having different thicknesses from each other can be loaded into the battery accommodating chamber 151.

Further, according to the battery of the present embodiment, where it is used with the image pickup apparatus 100 described above, the coupling state between the connector section 30 of the battery and the electronic apparatus side connector section 50 is kept stably, which is advantageous for supplying power stably from the battery to the image pickup apparatus 100.

Further, since the battery is biased toward the electronic apparatus side connector section 50 through the locking recess 1004, the overlapping amount of the contact pieces in a state wherein contact between the contact pieces is maintained well can be minimized when compared with an alternative case wherein the connector section 30 and the electronic apparatus side connector section 50 are merely connected to each other while the contact between the contact pieces is maintained well. Consequently, the dimension of the connector section 30 and the electronic apparatus side connector section 50 in the insertion direction of a battery can be reduced, which is advantageous for miniaturization of the image pickup apparatus 100.

Furthermore, since the locking recess 1004 is provided at a location displaced toward the front face 10A with respect to the center of the left and right side faces 10E in the forward and backward direction, even if the battery is inserted, for example, only at a portion thereof into the battery accommodating chamber 151 without the entirety thereof in the forward and backward direction thereof inserted, the locking portion 6002 can be lockably engaged with the locking recess 1004. Consequently, various connecting states of a battery can be coped with advantageously without the necessity to vary the design.

Second Embodiment

Figure 17:
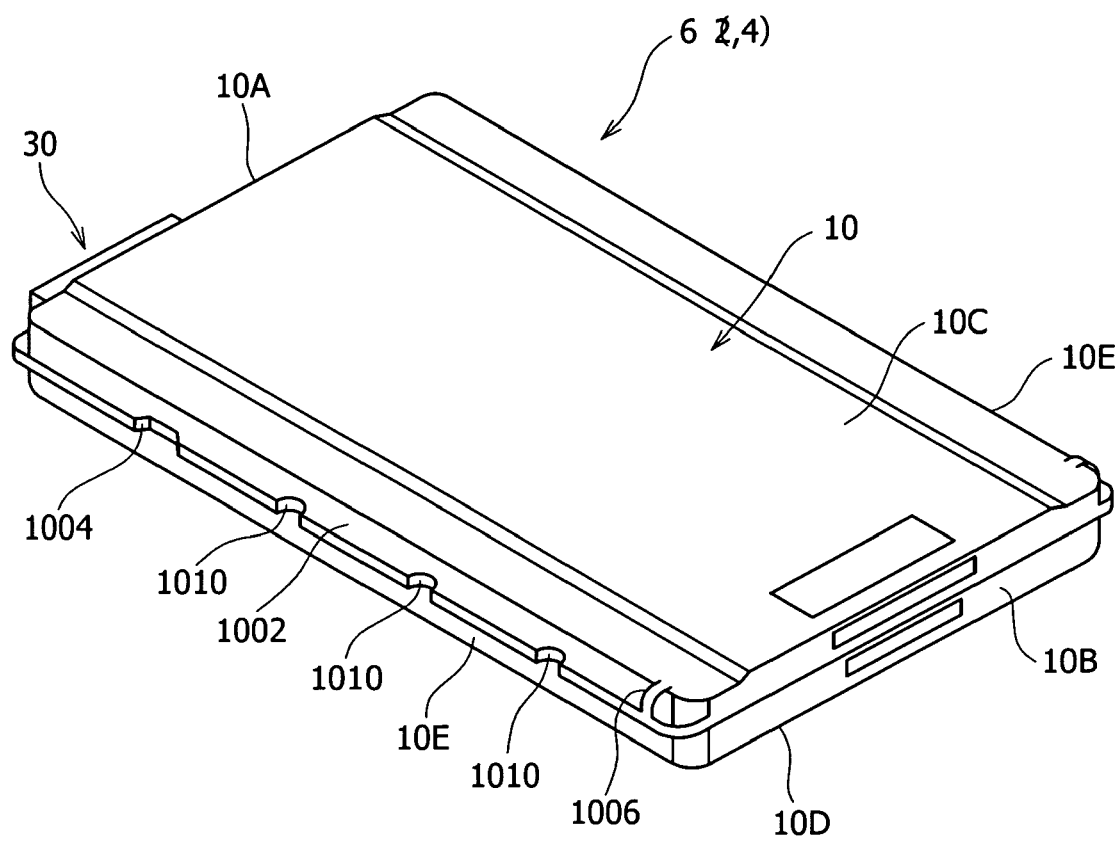
FIG. 17 is a perspective view of a battery according to a second embodiment of the present invention.
Figure 18:
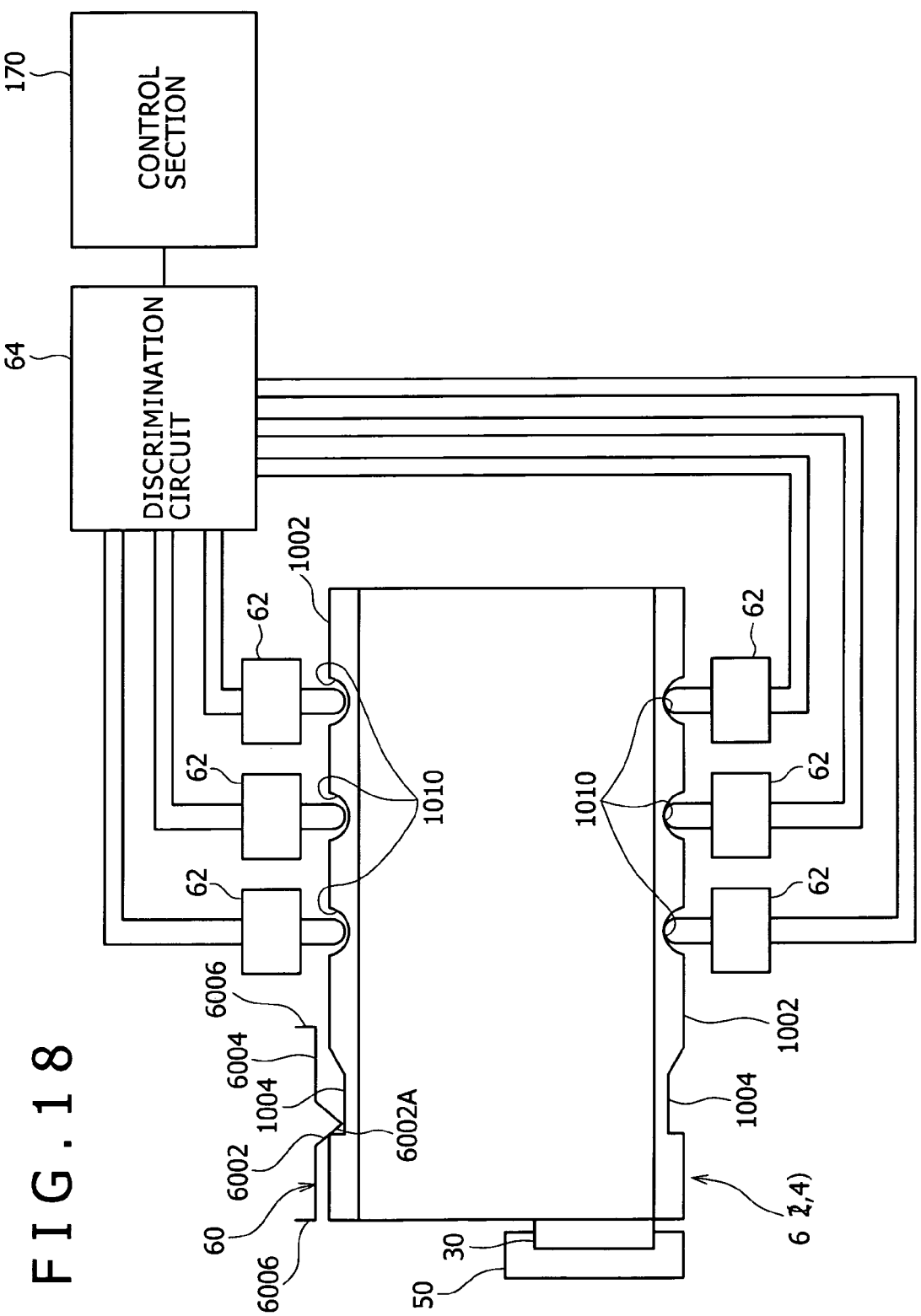
FIG. 18 is a schematic view showing a configuration of the battery and an image pickup apparatus according to the second embodiment of the present invention.

Now, a second embodiment of the present invention is described with reference to FIGS. 17 and 18.

The second embodiment is a modification to and is different from the first embodiment described hereinabove in that the case 10 of each battery has a plurality of discrimination recesses 1010 provided thereon in addition to the locking recess 1004 and a plurality of sensors 62 for detecting the discrimination recesses 1010 are provided in the case accommodating chamber 151A of the battery receiving section 150 of the image pickup apparatus 100. It is to be noted that, in the following description, the first and second batteries 2 and 4 are generally referred to each as battery 6 for the convenience of description.

Each of the left and right side faces 10E of the case 10 of the battery 6 has a plurality of discrimination recesses 1010 provided in a spaced relationship from each other in the forward and backward directions for discriminating a characteristic of the battery 6.

The characteristic of the battery 6 may be the capacity of the battery 6, the value of the charging current of the battery 6, information indicative of whether or not boost charge is possible or the like.

In the present embodiment, each of the left and right side faces 10E of the case 10 has a projecting wall 1002 provided thereon and serving as a reference to the position of the connector section 30 in the thicknesswise direction similarly as in the first embodiment. The discrimination recesses 1010 are provided by cutting away each of the projecting walls 1002 at a plurality of locations spaced from each other in the lengthwise direction (forward and backward direction).

The number or the discrimination recesses 1010 or the positions of the discrimination recesses 1010 in the lengthwise direction of the case 10 are determined in accordance with the characteristics of the battery 6.

The battery accommodating chamber 151 of the image pickup apparatus 100 includes a plurality of sensors 62 (sensors for detecting portions of the battery 6) for detecting whether or not the discrimination recesses 1010 are present individually in a state wherein the connector section 30 of the battery 6 is coupled to the electronic apparatus side connector section 50. Further, the image pickup apparatus 100 includes a discrimination circuit 64 serving as a discrimination section for discriminating the characteristics of the battery 6 accommodated in the battery accommodating chamber 151 based on detection signals of the sensors 62 and supplying a result of the identification to the control section 170.

In the present embodiment, engaging grooves 54 for engaging with the projecting walls 1002 are formed to extend in the insertion direction in the battery accommodating chamber 151 similarly as in the first embodiment, and a spring 60 for engaging with the locking recess 1004 is disposed in one of the engaging grooves 54 similarly as in the first embodiment. Further, micro-switches are disposed as the sensors 62 in the engaging grooves 54 such that they are retracted into the discrimination recesses 1010 such that they output detection signals when the connector section 30 is coupled to the electronic apparatus side connector section 50.

In the second embodiment, three sensors 64 are disposed in each of the left and right engaging grooves 54 of the image pickup apparatus 100, and consequently, totaling three sensors 64 are provided. Consequently, totaling 64 different kinds of information can be identified depending upon the combination of the detection signals from the six sensors 64. However, the number of the sensors 64 or the number of the discrimination recesses 1010 may otherwise be five or less or seven or more and can naturally be set arbitrarily.

According to the second embodiment, when the battery 6 is accommodated into the battery accommodating chamber 151, presence or absence of the discrimination recesses 1010 is detected by the sensors 62, and the discrimination circuit 64 identifies the characteristics of the battery 6 based on the detection signals from the sensors 62.

Accordingly, according to the second embodiment, the control section 170 of the image pickup apparatus 100 can perform various controls suitable for the characteristics of the battery 6 based on results of the detection.

For example, if the control section 170 of the image pickup apparatus 100 decides based on a result of discrimination of the capacity of the battery 6 loaded in the image pickup apparatus 100 that the capacity of the battery 6 is insufficient for the image pickup apparatus 100, then it can inhibit power supply from the battery 6 thereby to prevent such a disadvantageous situation that the image pickup apparatus 100 is placed into a disabled state because of shortage of power.

Further, where the electronic apparatus into which the battery 6 is loaded is a charging apparatus for charging the battery 6, sensors and a discrimination circuit similar to the discrimination recesses and the discrimination circuit 64 in the second embodiment may be provided in the electric apparatus such that the charging current or the charging time to the battery 6 can be controlled appropriately based on the value of appropriate charging current and information representative of whether or not boost charge is possible, which are discriminated by the discrimination circuit.

It is to be noted that, while, in the second embodiment described above, the characteristics described above of the battery 6 to be discriminated by the discrimination recesses 1010 are information representative of the capacity of the battery 6, the value of appropriate charging current and information indicative of whether or not boost charge is possible, it is possible to use various conventionally known characteristics as the characteristic to be discriminated by the discrimination recesses 1010. Also it is arbitrarily possible what controlling operation should be performed based on the characteristics.

Further, while, in the first and second embodiments described above, the electronic apparatus is an image pickup apparatus, the electronic apparatus is not limited to an image pickup apparatus but can be applied naturally to any apparatus in which a battery is loaded such as illumination apparatus, audio apparatus, communication apparatus and battery charging apparatus.

While preferred embodiments of the present invention have been described using specific terms, such description is for illustrative purpose only, and it is to be understood that changes and variations may be made without departing from the spirit or scope of the following claims.

What is claimed is:

1. A battery, comprising:
   a case of a flattened substantially rectangular plate shape having an upper face and a lower face positioned at the opposite ends in a thicknesswise direction, left and right side faces positioned at the opposite ends in a direction of a width having a greater dimension than the thickness and a front face and a rear face positioned at the opposite ends in a forward and backward direction of a length having a greater dimension than the width;
   a battery cell accommodated in an inside of said case; and
   a connector section provided on the front face of said case, wherein
   each of said left and right side faces of said case includes a locking recess for lockably engaging with a spring for biasing said case, and
   wherein a projecting wall is provided on each of said left and right side faces, the projecting wall projects outwardly from the left and right side faces in a widthwise direction and extends at least substantially an entire length of a lengthwise direction of the case, and wherein the locking recesses are grooves disposed on an outer edge of the projecting wall.

2. The battery according to claim 1, wherein said spring biases said case toward said connector section.

3. The battery according to claim 1, wherein the locking recesses are provided at locations of said left and right side faces of said case displaced to said front face with respect to the center in the forward and backward direction.

4. The battery according to claim 1, wherein each of said left and right side faces of said case has a discrimination recess provided thereon for discriminating a characteristic of said battery.

5. The battery according to claim 1, wherein each of said left and right side faces of said case has a plurality of discrimination recesses provided in a spaced relationship from each other in the forward and backward direction thereon for discriminating characteristics of said battery.

6. The battery according to claim 1, wherein each of said left and right side faces of said case having a plurality of discrimination recesses formed by cutting away the corresponding projecting wall at a plurality of locations spaced from each other in the lengthwise direction for discriminating characteristics of said battery.

* * * * *